UNITED STATES PATENT OFFICE.

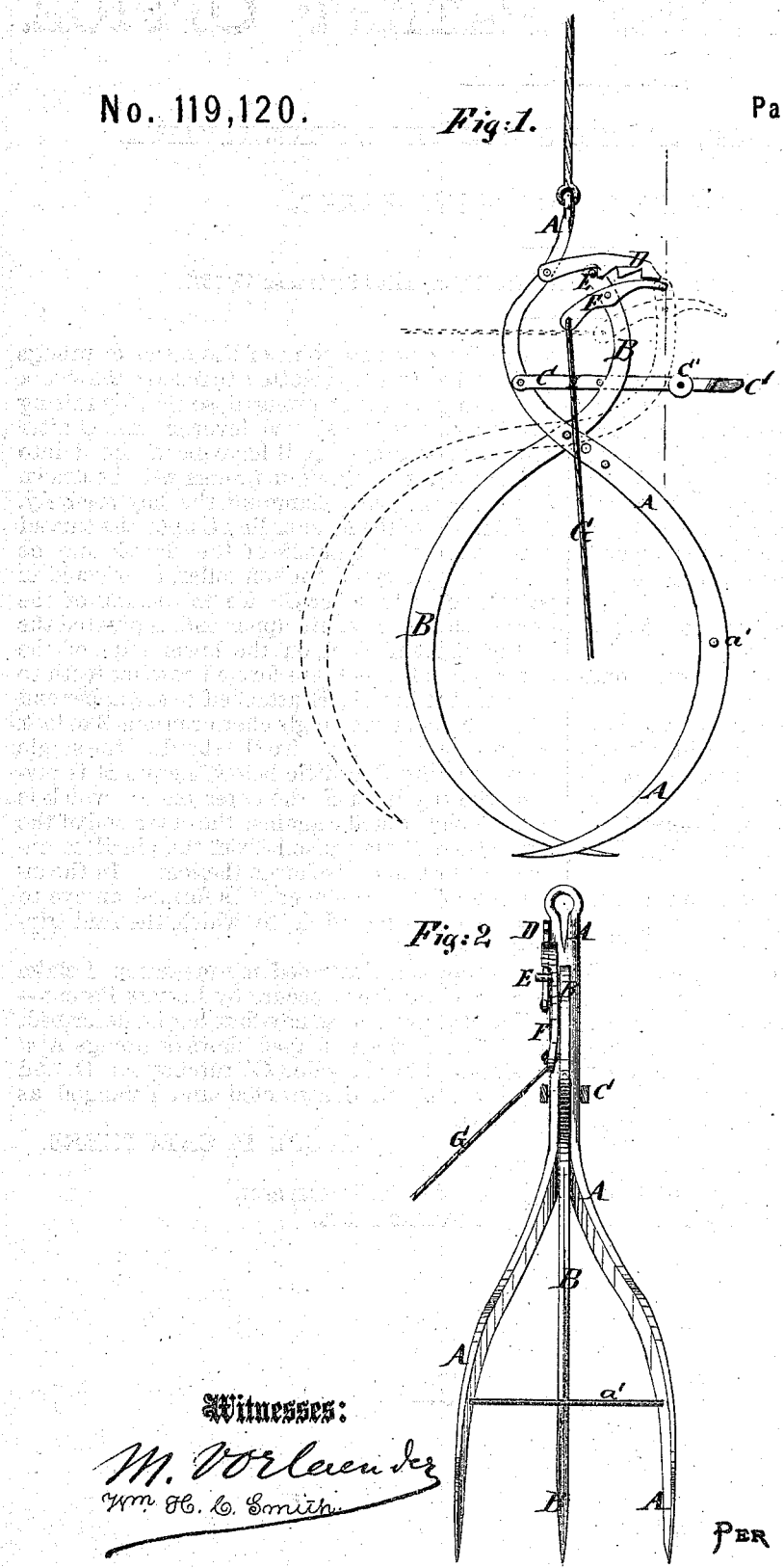

JACOB H. CAROTHERS, OF PINE GROVE MILLS, PENNSYLVANIA.

IMPROVEMENT IN HORSE HAY-FORKS.

Specification forming part of Letters Patent No. 119,120, dated September 19, 1871.

*To all whom it may concern:*

Be it known that I, JACOB H. CAROTHERS, of Pine Grove Mills, in the county of Centre and State of Pennsylvania, have invented a new and useful Improvement in Horse Hay-Fork; and I do hereby declare that the following is a full, clear, and exact description thereof, which will enable others skilled in the art to make and use the same, reference being had to the accompanying drawing forming part of this specification, in which—

Figure 1 is a side view of my improved fork. Fig. 2 is a front view of the same.

Similar letters of reference indicate corresponding parts.

My invention is an improvement in horse hay-forks of the class in which a lever or link is employed for causing the prongs or teeth to clamp or compress the hay between them; and the invention consists in the peculiar construction and arrangement of parts, as hereinafter described and claimed.

A is the double claw or prong, the lower parts of which are connected and held in their proper relative position by the round or bar $a'$, and between the upper parts of which is pivoted the upper part of the single claw or prong B. The upper parts or shanks of the claws or prongs A B are curved or bent, as shown in Fig. 1, to bring them into proper position for the closing, locking, and unlocking devices to operate properly. In the upper end of the shank of the double claw or prong A is formed an eye to receive the rope, by which the fork or claw is raised and transported. C is a lever, one end of which is pivoted to the shank of the double claw or prong A a little above the pivoting point of the claws or prongs A B. The lever C is slotted to receive the shank of the single claw or prong B, so that by raising the free end of the slotted lever or link C after the claws or prongs A B have been forced into the hay the said claws or prongs will be drawn toward each other, clamping the hay securely. The friction of the lever or link C upon the curved outer edge of the shank of the claw B may be lessened by a small friction-roller, $c'$, pivoted in the slot of said lever C. To the shank of the double claw A, near its upper end, is pivoted the end of the bar D, upon the lower edge of the outer part of which are formed ratchet-teeth to take hold of the pin E, attached to the upper end of the shank of the single claw or prong B to lock the fork upon the hay. To the shank of the single claw or prong B, a little below the pin E, is pivoted the trip-lever F, the outer end of which is made broad to strike against the outer end of the ratchet-bar D and raise it from the pin E to unlock the fork and discharge the load. In the inner end of the trip-lever F is formed an eye to receive the trip-cord G, by which the said trip-lever is operated.

Having thus described my invention, I claim as new and desire to secure by Letters Patent—

The improved horse hay-fork herein described, consisting of the S-shaped claws or prongs A $a'$ B, slotted link C, roller C', ratchet-bar D, and trip-lever F, all constructed and arranged as specified.

JACOB H. CAROTHERS.

Witnesses:
JAMES A. THOMPSON,
THOMAS HESS.